United States Patent
Clarke et al.

(10) Patent No.: US 12,497,207 B2
(45) Date of Patent: Dec. 16, 2025

(54) CONTAINER AND MANUFACTURE THEREOF

(71) Applicant: Bockatech Ltd., Cambridgeshire (GB)

(72) Inventors: Peter Reginald Clarke, Cambridgeshire (GB); Chris Bocking, Cambridgeshire (GB)

(73) Assignee: Bockatech Ltd., Cambridgeshire (GB)

( * ) Notice: Subject to any disclaimer, the term of this patent is extended or adjusted under 35 U.S.C. 154(b) by 355 days.

(21) Appl. No.: 17/928,657

(22) PCT Filed: Jul. 16, 2021

(86) PCT No.: PCT/EP2021/070044
§ 371 (c)(1),
(2) Date: Nov. 30, 2022

(87) PCT Pub. No.: WO2022/017988
PCT Pub. Date: Jan. 27, 2022

(65) Prior Publication Data
US 2023/0331427 A1    Oct. 19, 2023

(30) Foreign Application Priority Data

Jul. 22, 2020 (GB) ........................ 2011345
Nov. 11, 2020 (GB) ........................ 2017812
Nov. 11, 2020 (GB) ........................ 2017813

(51) Int. Cl.
*B65D 1/34* (2006.01)
*B29C 33/00* (2006.01)
(Continued)

(52) U.S. Cl.
CPC ............ *B65D 1/34* (2013.01); *B29C 33/0033* (2013.01); *B29C 44/18* (2013.01);
(Continued)

(58) Field of Classification Search
CPC . B65D 1/34; B65D 1/265; B65D 1/36; B65D 1/40; B65D 1/42; B65D 5/2038;
(Continued)

(56) References Cited

U.S. PATENT DOCUMENTS 4,948,039 A * 8/1990 Amatangelo ........ B65D 65/406
229/942
2012/0024941 A1   2/2012 Skinner

FOREIGN PATENT DOCUMENTS

EP    4139219    * 7/2020 ............. B29C 44/02
GB    2163132    * 2/1986 ............. B65D 25/16
(Continued)

OTHER PUBLICATIONS

International Preliminary Report on Patentability in related international application PCT/EP2021/070044 issued on Jan. 24, 2023.
(Continued)

*Primary Examiner* — Don M Anderson
*Assistant Examiner* — Elizabeth J Volz
(74) *Attorney, Agent, or Firm* — POLSINELLI PC (57) ABSTRACT

An intermediate article for assembly to form a container, the intermediate article having a base which is polygonal in plan and having an annular peripheral edge with a plurality of edge portions surrounding a base wall structure, a plurality of wall elements around the base, each wall element being adjacent to a respective edge portion of the polygonal base, wherein each wall element has a pair of opposite outwardly extending edges having a sidewall structure therebetween, each outwardly extending edge comprising at least one member of a respective fixing mechanism for affixing adjacent outwardly extending edges of adjacent wall elements, wherein the sidewall and the base are composed of an injection moulded thermoplastic polymer, and a flexible sheet having a central part which is bonded to the base wall
(Continued)

structure and a plurality of extending parts, each extending part being connected to, and extending away from, the central part, each extending part being bonded to the sidewall structure of a respective wall element, wherein each extending part is connected to the central part by a respective hinge part of the flexible sheet, whereby each wall element is hingedly connected to the base by the respective hinge part, wherein the wall elements can be hinged upwardly relative to the base to form a container having a sidewall which is polygonal in plan and defines a central concavity for packaging a product, wherein the sidewall has the plurality of wall elements which are connected in series to form an endless wall member extending upwardly from the base, each outwardly extending edge being affixed to an adjacent outwardly extending edge of an adjacent wall element by a respective fixing mechanism at a respective corner portion of the sidewall.

23 Claims, 4 Drawing Sheets

(51) Int. Cl.
| | | |
|---|---|---|
| B29C 44/18 | (2006.01) | |
| B29C 45/00 | (2006.01) | |
| B29C 45/14 | (2006.01) | |
| B29C 45/17 | (2006.01) | |
| B29C 45/37 | (2006.01) | |
| B65D 1/26 | (2006.01) | |
| B65D 1/36 | (2006.01) | |
| B65D 1/40 | (2006.01) | |
| B65D 1/42 | (2006.01) | |
| B65D 5/20 | (2006.01) | |
| B65D 5/66 | (2006.01) | |
| B65D 65/46 | (2006.01) | |
| B29C 44/42 | (2006.01) | |
| B29C 44/58 | (2006.01) | |
| B29K 101/12 | (2006.01) | |
| B29K 105/04 | (2006.01) | |
| B29L 31/00 | (2006.01) | |

(52) U.S. Cl.
CPC .... *B29C 45/0081* (2013.01); *B29C 45/14336* (2013.01); *B29C 45/1704* (2013.01); *B29C 45/1706* (2013.01); *B29C 45/37* (2013.01); *B65D 1/265* (2013.01); *B65D 1/36* (2013.01); *B65D 1/40* (2013.01); *B65D 1/42* (2013.01); *B65D 5/2038* (2013.01); *B65D 5/66* (2013.01); *B65D 65/466* (2013.01); *B29C 44/428* (2013.01); *B29C 44/583* (2013.01); *B29K 2101/12* (2013.01); *B29K 2105/04* (2013.01); *B29L 2031/712* (2013.01); *B29L 2031/7132* (2013.01); *B29L 2031/737* (2013.01)

(58) Field of Classification Search
CPC .... B65D 5/66; B65D 65/466; B29C 33/0033; B29C 44/18; B29C 44/428; B29C 44/583; B29C 45/0081; B29C 45/14336; B29C 45/1704; B29C 45/1706; B29C 45/37; B29K 2101/12; B29K 2105/04; B29L 2031/712; B29L 2031/7132; B29L 2031/737
USPC .......................................................... 220/6
See application file for complete search history.

(56) References Cited

FOREIGN PATENT DOCUMENTS

| GB | 2163132 A | 2/1986 |
| WO | 2005097488 A1 | 10/2005 |

OTHER PUBLICATIONS

Combined Search and Examination Report Under Sections 17 and 18(3) in related GB application 2017813.3 issued on Apr. 19, 2021.
International Search Report and Written Opinion in related international application PCT/EP2021/070044 issued on Jan. 19, 2022.

* cited by examiner

CONTAINER AND MANUFACTURE THEREOF

FIELD OF THE INVENTION

The present invention relates to the manufacture of thermoplastic polymer containers, e.g. containers for foodstuffs and/or beverages. The present invention also relates to an intermediate article for assembly to form a container.

BACKGROUND

In the packaging industry, there is a general need to make disposable packaging of recyclable material. Preferably, the packaging is made of a single recyclable material, such as PET or a polyolefin. There is also a general need to reduce the mass of thermoplastic material used for any given packaging article. The reduced mass not only reduces the cost of manufacturing the packaging article, but also reduces the volume of material to be recycled.

Efforts have been made in the industry to provide various disposable packaging articles. For example, WO-A-2017/134181, WO-A-2019/025274 and WO-A-2020/048912 disclose the manufacture of a lightweight polypropylene cup which has expanded regions comprising a cellular foam.

SUMMARY OF THE INVENTION

However, despite this prior art disclosure there is still a need to produce thermoplastic containers, in particular containers for foodstuffs and/or beverages, which have even smaller wall thickness and even lower mass, yet high stiffness, as well as low cost. Typically, containers for foodstuffs and/or beverages are required to have a desired precise geometrical shape, yet nevertheless have high wall strength, and preferably are readily recyclable, most preferably being composed of a single recyclable material.

The present invention aims at least partially to overcome the problem of achieving even smaller wall thickness and even lower mass, a desired precise geometrical shape, yet nevertheless high stiffness and wall strength, in containers for foodstuffs and/or beverages, which preferably are composed of a single recyclable material.

The present invention provides an intermediate article for assembly to form a container, the intermediate article comprising a base which is polygonal in plan and comprises an annular peripheral edge comprising a plurality of edge portions surrounding a base wall structure, a plurality of wall elements around the base, each wall element being adjacent to a respective edge portion of the polygonal base, wherein each wall element has a pair of opposite outwardly extending edges having a sidewall structure therebetween, each outwardly extending edge comprising at least one member of a respective fixing mechanism for affixing adjacent outwardly extending edges of adjacent wall elements, wherein the sidewall and the base are composed of an injection moulded thermoplastic polymer, and a flexible sheet which comprises a central part which is bonded to the base wall structure and a plurality of extending parts, each extending part being connected to, and extending away from, the central part, each extending part being bonded to the sidewall structure of a respective wall element, wherein each extending part is connected to the central part by a respective hinge part of the flexible sheet, whereby each wall element is hingedly connected to the base by the respective hinge part, wherein the wall elements can be hinged upwardly relative to the base to form a container having a sidewall which is polygonal in plan and defines a central concavity for packaging a product, wherein the sidewall comprises the plurality of wall elements which are connected in series to form an endless wall member extending upwardly from the base, each outwardly extending edge being affixed to an adjacent outwardly extending edge of an adjacent wall element by a respective fixing mechanism at a respective corner portion of the sidewall.

The present invention also provides a method of manufacturing an intermediate article for assembly to form a container, the method comprising the steps of:
  (a) providing a mould having a first mould part and a second mould part, the first and second mould parts having respective first and second cavity-forming surfaces for forming an intermediate article for assembly into a container comprising a sidewall and a base of the container which define a central concavity for packaging a product in the container;
  (b) providing an in-mould flexible sheet between the first and second cavity-forming surfaces, the flexible sheet comprising a central part and a plurality of extending parts which extend away from the central part;
  (c) closing the mould thereby defining a cavity between the first and second cavity-forming surfaces, wherein the cavity comprises a first cavity portion being configured for moulding a polygonal base and a plurality of second cavity portions around the first cavity portion, each of the second cavity portions being configured for moulding a respective wall element adjacent to a respective edge portion of the polygonal base, the central part of the flexible sheet being located within the first cavity portion and each extending part of the flexible sheet being located within a respective second cavity portion;
  (d) injecting a molten plastic composition comprising a thermoplastic polymer into the mould cavity;
  (e) cooling the molten plastic composition to solidify the thermoplastic polymer and form the intermediate article wherein the central part is bonded to a base wall structure of the base and each extending part is bonded to a sidewall structure of a respective wall element; and
  (f) opening the mould and removing the intermediate article from the mould, wherein in the intermediate article each extending part is connected to the central part by a respective hinge part of the flexible sheet, whereby each wall element is hingedly connected to the base by the respective hinge part and the wall elements can be hinged upwardly to form an endless wall member in which the wall elements are connected in series to extend upwardly from the base to form an annular sidewall of the container, wherein the sidewall and the base have a polygonal shape in plan.

The present invention further provides a container formed from the intermediate article of the present invention or manufactured by the method of the present invention, wherein the container is formed by hinging upwardly each wall element relative to the base by the respective hinge part to form an endless wall member in which the wall elements are connected in series to extend upwardly from the base to form an annular sidewall of the container, and each outwardly extending edge is affixed to an adjacent outwardly extending edge of an adjacent wall element by a respective fixing mechanism at a respective corner portion of the sidewall.

According to one embodiment, an intermediate article for assembly to form a container is provided, the intermediate article comprising:

a base which is polygonal in plan and comprises an annular peripheral edge comprising a plurality of edge portions surrounding a base wall structure, a plurality of wall elements around the base, each wall element being adjacent to a respective edge portion of the polygonal base, wherein each wall element has a pair of opposite outwardly extending edges having a sidewall structure therebetween, each outwardly extending edge comprising at least one member of a respective fixing mechanism for affixing adjacent outwardly extending edges of adjacent wall elements, wherein the sidewall and the base are composed of an injection moulded thermoplastic polymer, and a flexible sheet which comprises a central part which is bonded to the base wall structure and a plurality of extending parts, each extending part being connected to, and extending away from, the central part, each extending part being bonded to the sidewall structure of a respective wall element, wherein each extending part is connected to the central part by a respective hinge part of the flexible sheet, whereby each wall element is hingedly connected to the base by the respective hinge part, wherein the wall elements can be hinged upwardly relative to the base to form a container having a sidewall which is polygonal in plan and defines a central concavity for packaging a product, wherein the sidewall comprises the plurality of wall elements which are connected in series to form an endless wall member extending upwardly from the base, each outwardly extending edge being affixed to an adjacent outwardly extending edge of an adjacent wall element by a respective fixing mechanism at a respective corner portion of the sidewall.

According to one embodiment, the sidewall structure comprises a lattice structure of elongate ribs interconnecting upper and lower peripheral edges of the wall element, wherein the lattice structure is an open framework defining a plurality of sidewall openings, and wherein the flexible sheet is bonded to the lattice structure to cover the sidewall openings and form a sealed sidewall surface of the wall element.

According to one embodiment, in each wall element a plurality of the elongate ribs are serially located in a mutually spaced configuration along a width of the wall element, optionally wherein in the lattice structure in the sidewall at least some of the elongate ribs extend between the upper and lower peripheral edges of the wall element.

According to one embodiment, in the lattice structure in the wall element at least some of the elongate ribs extend in a transverse direction across at least a fraction of the width of the wall element.

According to one embodiment, the base wall structure comprises a base lattice structure of elongate ribs connected to the annular peripheral edge of the base, wherein the base lattice structure is an open framework defining a plurality of base openings, and wherein the flexible sheet is bonded to the base lattice structure to cover the base openings and form a sealed base surface of the container.

According to one embodiment, each opening in the sidewall lattice structure and the base lattice structure is covered by a respective portion of the flexible sheet.

According to one embodiment, each of the outwardly extending edges of the wall elements has bonded thereto a peripheral side edge of a respective extending part of the flexible sheet.

According to one embodiment, at each respective corner portion of the sidewall the peripheral side edges of the opposite extending parts of the flexible sheet are spaced from each other by a spacing extending along the corner portion.

According to one embodiment, the flexible sheet has an outer peripheral edge which is sealed within the thickness of the sidewall or base.

According to one embodiment, the container further comprises a lid which is composed of a thermoplastic polymer and is removably fittable to the sidewall, wherein the flexible sheet comprises an integral extension part which is connected to a sidewall-covering portion of the flexible sheet which is bonded to one of the wall elements to form the sidewall and extends away therefrom to form a lid portion of the flexible sheet which is bonded to the lid.

According to one embodiment, the integral extension part forms a hinge for the lid and/or a tamper evident connection between the lid and the sidewall.

According to one embodiment, the lid comprises a lid lattice structure of elongate ribs integrally connected to an annular peripheral edge of the lid, wherein the lid lattice structure is an open framework defining a plurality of lid openings, and wherein the flexible sheet is bonded to the lid lattice structure to cover the lid openings and form a sealed lid surface of the container.

According to one embodiment, the wall elements, sidewall and the base are integrally or separately moulded, the lid is separately moulded from the wall elements and the base, and the integral extension part of the flexible sheet comprises the sole mechanical connection between the lid and the sidewall in the container.

According to one embodiment, in at least one of lattice structures in the base or the lid at least some of the elongate ribs extend radially outwardly from a centre of the base or lid respectively.

According to one embodiment, in at least one of lattice structures in the wall elements, the base or the lid at least some of the elongate ribs intersect with one or more other of the elongate ribs at rib junctions to form an intersecting rib network.

According to one embodiment, the fixing mechanism comprises a plurality of snap-fitting locking members on the outwardly extending edges of the wall elements.

According to one embodiment, the base and wall elements are integral and the base wall structure comprises at least one injection moulding sprue at a central region of the base wall structure.

According to one embodiment, the flexible sheet is bonded to an outer surface of each sidewall structure and the base structure and the outer surface of the flexible sheet forms an exterior surface of the container.

According to one embodiment, the flexible sheet is composed of a thermoplastic polymer film comprising a single polymer layer, optionally wherein the single polymer layer comprises an oriented polymer film or a heat-shrunk polymer film, a multilayer laminate, optionally wherein the multilayer laminate comprises a barrier layer comprising a metal or polymer, a woven or non-woven thermoplastic polymer fabric, optionally which is porous to air, or a foamed thermoplastic polymer layer comprising opposed unfoamed solid skins of the thermoplastic polymer on opposite sides of a central cellular foam core of the thermoplastic polymer.

According to one embodiment, at least one or both of an outer surface and an inner surface of the flexible sheet is printed and/or embossed.

According to one embodiment, a method of manufacturing an intermediate article to form a container is provided, the method comprising:
(a) providing a mould having a first mould part and a second mould part, the first and second mould parts having respective first and second cavity-forming surfaces for forming an intermediate article for assembly into a container comprising a sidewall and a base of the container which define a central concavity for packaging a product in the container;
(b) providing an in-mould flexible sheet between the first and second cavity-forming surfaces, the flexible sheet comprising a central part and a plurality of extending parts which extend away from the central part;
(c) closing the mould thereby defining a cavity between the first and second cavity-forming surfaces, wherein the cavity comprises a first cavity portion being configured for moulding a polygonal base and a plurality of second cavity portions around the first cavity portion, each of the second cavity portions being configured for moulding a respective wall element adjacent to a respective edge portion of the polygonal base, the central part of the flexible sheet being located within the first cavity portion and each extending part of the flexible sheet being located within a respective second cavity portion;
(d) injecting a molten plastic composition comprising a thermoplastic polymer into the mould cavity;
(e) cooling the molten plastic composition to solidify the thermoplastic polymer and form the intermediate article wherein the central part is bonded to a base wall structure of the base and each extending part is bonded to a sidewall structure of a respective wall element; and
(f) opening the mould and removing the intermediate article from the mould, wherein in the intermediate article each extending part is connected to the central part by a respective hinge part of the flexible sheet, whereby each wall element is hingedly connected to the base by the respective hinge part and the wall elements can be hinged upwardly to form an endless wall member in which the wall elements are connected in series to extend upwardly from the base to form an annular sidewall of the container, wherein the sidewall and the base have a polygonal shape in plan.

According to one embodiment, the intermediate article is substantially planar.

According to one embodiment. each wall element has a pair of opposite side edges which are upwardly extending in the assembled container, wherein each upwardly extending edge is affixed to an adjacent upwardly extending edge of an adjacent wall element by a respective fixing mechanism at a respective corner portion of the sidewall.

According to one embodiment, the fixing mechanism comprises a plurality of snap-fitting locking members on the upwardly extending edges of the wall elements.

According to one embodiment, each of the upwardly extending edges of the wall elements has bonded thereto a peripheral side edge of a respective extending part of the flexible sheet.

According to one embodiment, at a respective corner portion of the sidewall the peripheral side edges of the opposite extending parts of the flexible sheet are spaced from each other by a spacing extending along the corner portion.

According to one embodiment, after step (e) the flexible sheet has an outer peripheral edge which is sealed within the thickness of the sidewall or base.

According to one embodiment, the first and second cavity-forming surfaces have respective first and second regions for moulding the wall elements of sidewall of a container; in step (b) the in-mould flexible sheet is provided between the first and second regions; in step (c) the first region of the first cavity-forming surface comprises a lattice-forming portion, comprising a latticed network of concavities in the first cavity-forming surface, the flexible sheet being located within the cavity adjacent to the lattice-forming portion of the first cavity-forming surface or adjacent to the second cavity-forming surface at a location opposite the lattice-forming portion of the first cavity-forming surface, wherein a plurality of opening-forming portions of the mould are provided adjacent to the concavities, and in the opening-forming portions of the mould the flexible sheet is held between the first and second cavity-forming surfaces; in step (d) a lattice-forming part of the thermoplastic polymer is injected into at least the latticed network of concavities, wherein the lattice-forming part defines a lattice structure of elongate ribs interconnecting upper and lower annular peripheral edges of the wall elements of, wherein the lattice structure is an open framework defining a plurality of sidewall openings formed by the plurality of opening-forming portions of the mould; and in step (e) the flexible sheet is bonded to the lattice structure to cover the sidewall openings and form a sealed sidewall surface of the container.

According to one embodiment, in step (c) the flexible sheet is located adjacent to an outer mould part of the first and second mould parts which forms an outer surface of the container, and after step (e) the flexible sheet is bonded to an outer surface of the lattice structure and the inner surface of the lattice structure and exposed regions of the inner surface of the flexible sheet within the sidewall openings form an interior surface of the sidewall, or wherein in step (c) the flexible sheet is located adjacent to an inner mould part of the first and second mould parts which forms an inner surface of the container, and after step (e) the flexible sheet is bonded to an inner surface of the lattice structure and an inner surface of the flexible sheet forms the interior surface of the sidewall.

According to one embodiment, a base region of the first cavity-forming surface comprises a base lattice-forming portion, comprising a base latticed network of base concavities in the first cavity-forming surface;
in step (c) the flexible sheet is located within the cavity adjacent to the base lattice-forming portion of the first cavity-forming surface or adjacent to the second cavity-forming surface at a location opposite the base lattice-forming portion of the first cavity-forming surface, wherein a plurality of base opening-forming portions of the mould are provided adjacent to the base concavities, and in the base opening-forming portions of the mould the flexible sheet is held between the first and second cavity-forming surfaces;
in step (d) a base lattice-forming part of the molten plastic composition is injected into the base latticed network of base concavities, wherein the base lattice-forming part defines a base lattice structure of elongate ribs connected to an annular peripheral edge of the base, wherein the base lattice structure is an open framework defining a plurality of base openings; and
after step (e) the flexible sheet is bonded to the base lattice structure to cover the base openings and form a sealed base surface of the container.

According to one embodiment, after step (e) each opening in at least the sidewall is covered by a respective portion of the flexible sheet.

According to one embodiment, after step (e) the flexible sheet is heat-shrunk in a heat shrinking step (f) whereby each portion of the heat-shrunk flexible sheet is under tension.

According to one embodiment, the mould further comprises third and fourth cavity-forming surfaces defining a lid-forming cavity for forming a lid of the container, in step (c) the in-mould flexible sheet extends into the lid-forming cavity, and in step (d) the molten plastic composition is injected into the lid-forming cavity to form a lid composed of the thermoplastic polymer, whereby after step (e) the lid is removably fittable to the sidewall, and the flexible sheet comprises an integral extension part which is connected to a sidewall-covering portion of the flexible sheet which is bonded to the sidewall and extends away therefrom to form a lid portion of the flexible sheet which is bonded to the lid.

According to one embodiment, the integral extension part forms a hinge for the lid and/or a tamper evident connection between the lid and the sidewall.

According to one embodiment, the lid comprises a lid lattice structure of elongate ribs connected to an annular peripheral edge of the lid, wherein the lid lattice structure is an open framework defining a plurality of lid openings, and wherein the flexible sheet is bonded to the lid lattice structure to cover the lid openings and form a sealed lid surface of the container.

According to one embodiment, the flexible sheet is composed of a thermoplastic polymer film comprising a single polymer layer, optionally wherein the single polymer layer comprises an oriented polymer film or a heat-shrinkable polymer film, a multilayer laminate, optionally wherein the multilayer laminate comprises a barrier layer comprising a metal or polymer, a woven or non-woven thermoplastic polymer fabric, optionally which is porous to air, or a foamed thermoplastic polymer layer comprising opposed unfoamed solid skins of the thermoplastic polymer on opposite sides of a central cellular foam core of the thermoplastic polymer.

According to one embodiment, the container is formed by hinging upwardly each wall element relative to the base by the respective hinge part to form an endless wall member in which the wall elements are connected in series to extend upwardly from the base to form an annular sidewall of the container, and each outwardly extending edge is affixed to an adjacent outwardly extending edge of an adjacent wall element by a respective fixing mechanism at a respective corner portion of the sidewall.

BRIEF DESCRIPTION OF THE DRAWINGS

Embodiments of the present invention will now be described by way of example only with reference to the accompanying drawings, in which.

The drawings are highly schematic and not necessarily to scale, and some dimensions may be exaggerated for the purpose of clarity of illustration.

DETAILED DESCRIPTION

Figure 1:
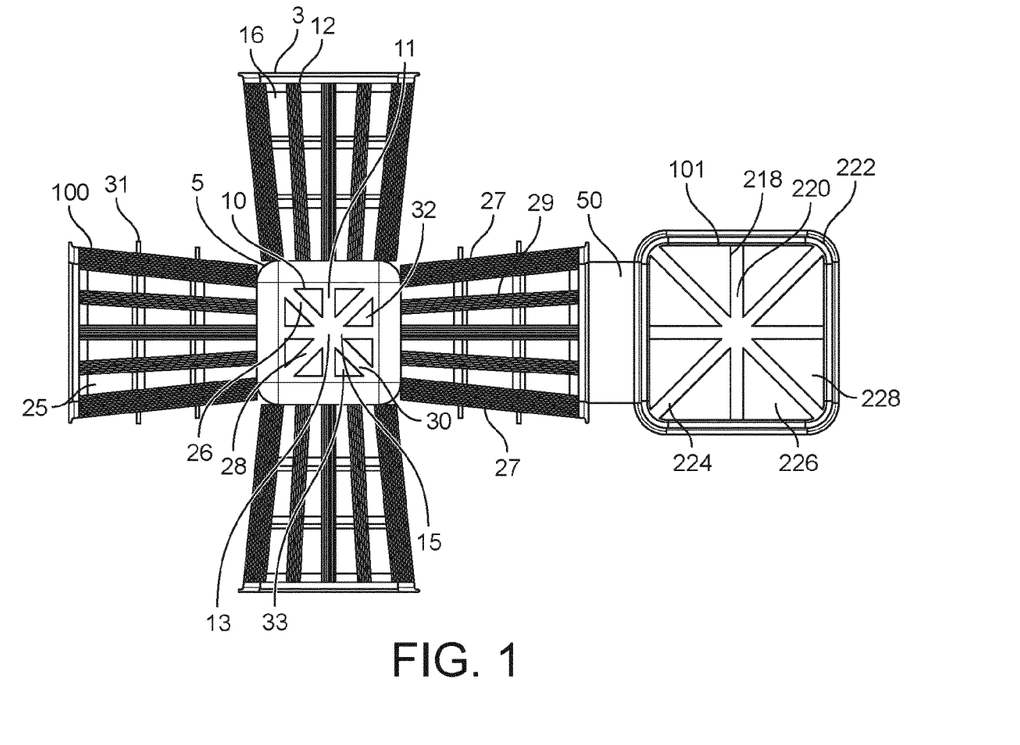
FIG. 1 is a plan view of an intermediate article to be assembled to form a square pot with a removable lid in accordance with an embodiment of the present invention.
Figure 2:
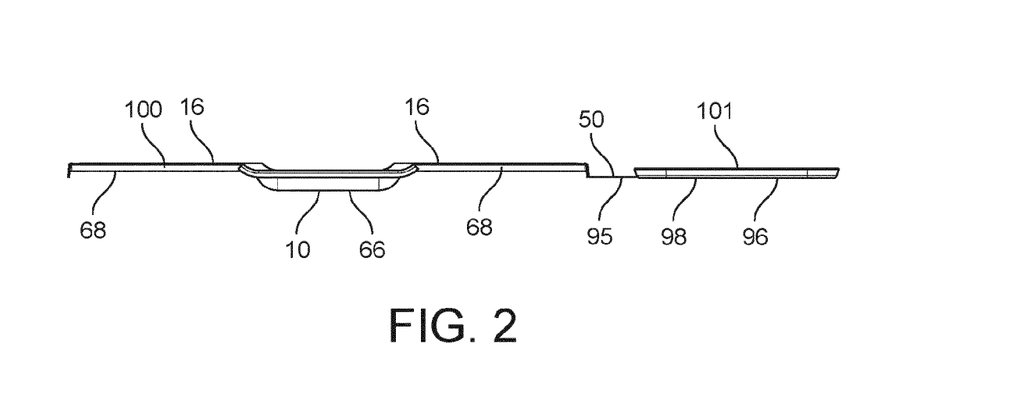
FIG. 2 is a side view of the intermediate article of FIG. 1.

In accordance with the present invention, an intermediate article 100 for assembly to form a container is injection moulded as shown in FIGS. 1 and 2. The intermediate article 100 has a flat or substantially planar configuration, and thereby is manufactured as a substantially two-dimensional moulded product. The intermediate article 100 comprises one or more moulded parts to form the base 10 and sidewall 4 of a container 2; preferably the base 10 and sidewall 4 are integrally moulded, but alternatively they may be moulded as separate moulded parts. The moulded parts to form the sidewall 4 are separate wall elements 16 which are located in a cross-shaped or star-shaped configuration around the base 10. When there are four wall elements 16 there is a cross-shaped configuration; whereas when there are three, five, six, etc. wall elements 16 there is a star-shaped configuration, with the number of arms of the star corresponding to the number of wall elements 16.

The base 10 is polygonal in plan and comprises an annular peripheral edge 12 comprising a plurality of edge portions 5 surrounding a base wall structure 11. A plurality of the wall elements 16 are around the base 10. Each wall element 16 is adjacent to a respective edge portion 5 of the polygonal base 10. Each wall element 16 has a pair of opposite outwardly extending edges 27 having a sidewall structure 29 therebetween. Each outwardly extending edge 27 comprises at least one member of a respective fixing mechanism 31 for affixing adjacent outwardly extending edges 27 of adjacent wall elements 16. For example, the fixing members comprise complementary male and female parts for clipping together the affixing adjacent outwardly extending edges 27 of adjacent wall elements 16 in a snap-fitting connection.

The intermediate article 100 further comprises a moulded part to form a lid 101 of the container 2. Preferably, the lid 101 is moulded as a separate moulded part from the base 10 and wall elements 16 to form the sidewall 2, and is aligned with but spaced from one of the wall elements 16 to form the sidewall 2; however, alternatively the lid 101 may be integrally moulded with one of the wall elements 16 to form the sidewall 2.

Figure 3:
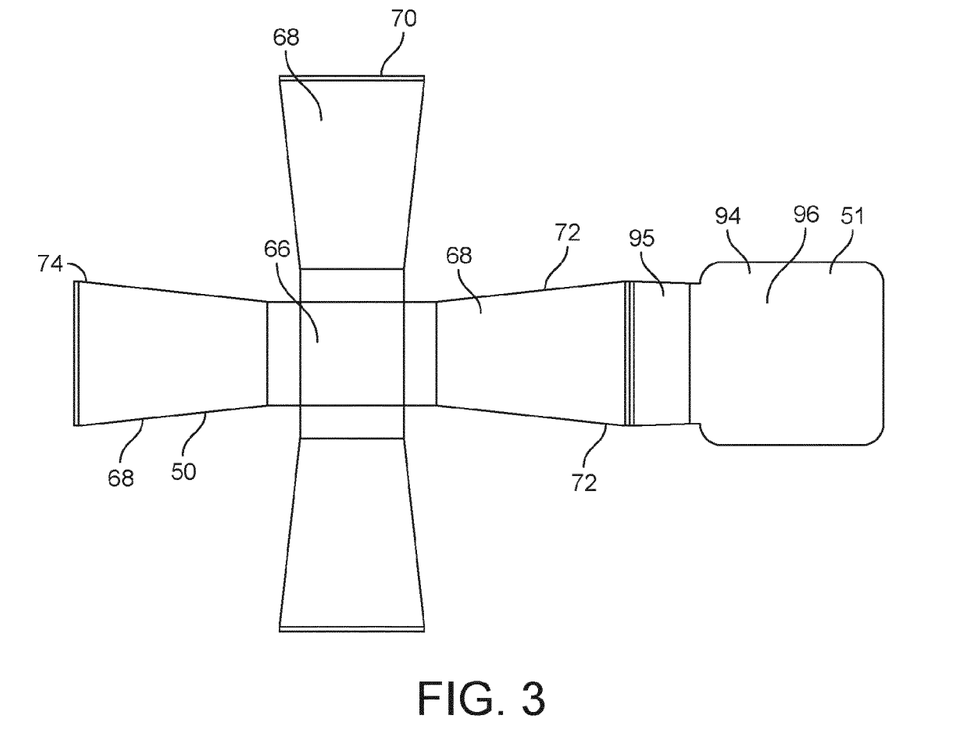
FIG. 3 is a plan view of a flexible sheet in the intermediate article of FIG. 1.

A flexible sheet 50, shown independently in FIG. 3, is moulded together with the one or more moulded parts to form the base 10 and sidewall 2 and the moulded part to form the lid 101. The flexible sheet 50 has a cross-shaped, or star-shaped, configuration which matches the configuration of the base 10, wall elements 16 and lid 101, The flexible sheet 50 is bonded, using an in-mould labelling (IML) technique, to the moulded parts of the intermediate article 100. The flexible sheet 50 has a base-covering central part 66 and a plurality of sidewall-covering extending parts 68 connected to the central part 66 which extend away from the central part 66, each extending part 68 being configured to cover a respective wall element 16. The flexible sheet 50 also comprises an integral extension part 94 which is connected to one of the sidewall-covering extending parts 68 of the flexible sheet 50 which is bonded to the sidewall 4. The integral extension part 94 extends away from the sidewall-covering extending part 68 to form a lid portion 96 of the flexible sheet 50 which is bonded to the lid 101, preferably the outer surface 98 of the lid 101.

The integral extension part 94 forms a hinge 95 for the lid 101 and/or a tamper evident connection between the lid 101 and the sidewall 4.

Apart from the extending part 68 to which the integral extension part 94 is connected, the remaining extending parts 68 have a peripheral end edge 70, The extending parts 68 have opposed peripheral side edges 72 which connect the end edge 70, or the integral extension part 94, to the central part 66. The peripheral end edges 70, the peripheral side edges 72 and the integral extension part 94 form an entire outer peripheral edge 74 of the flexible sheet 50. The central part 66 is bonded to the base wall structure 11 and each extending part 68 is bonded to the sidewall structure 29 of a respective wall element 16.

The flexible sheet 50 forms a hinge connection between each wall element 16 and the base 10, and between the lid 101 and one of the wall elements 16.

After the intermediate article 100 is demoulded, the wall elements 16 can be hinged upwardly relative to the base 10 to form a container 2 having an annular sidewall 4 surrounding the base 10. The sidewall 2 is polygonal in plan and defines a central concavity for packaging a product. The sidewall 2 comprises the plurality of wall elements 16 which are connected in series to form an endless wall member extending upwardly from the base 10. Each outwardly extending edge 27 is affixed to an adjacent outwardly extending edge 27 of an adjacent wall element 16 by a respective fixing mechanism 31 at a respective corner portion 19 of the sidewall 2. The adjacent edges 27 of the adjacent wall elements 16 can be snap-fitted together by fixing mechanisms 31 to assemble the container 2. This assembly provides a three-dimensional container 2 having a removable lid 101 which is hingedly connected to the container body by the flexible sheet 50.

Figure 4:
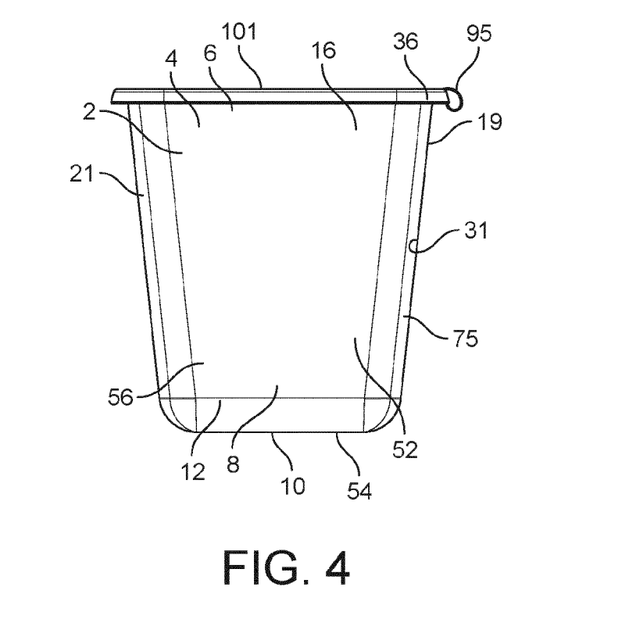
FIG. 4 is a side view of a square pot with a lid in a closed configuration formed from the intermediate article of FIG. 1.
Figure 5:
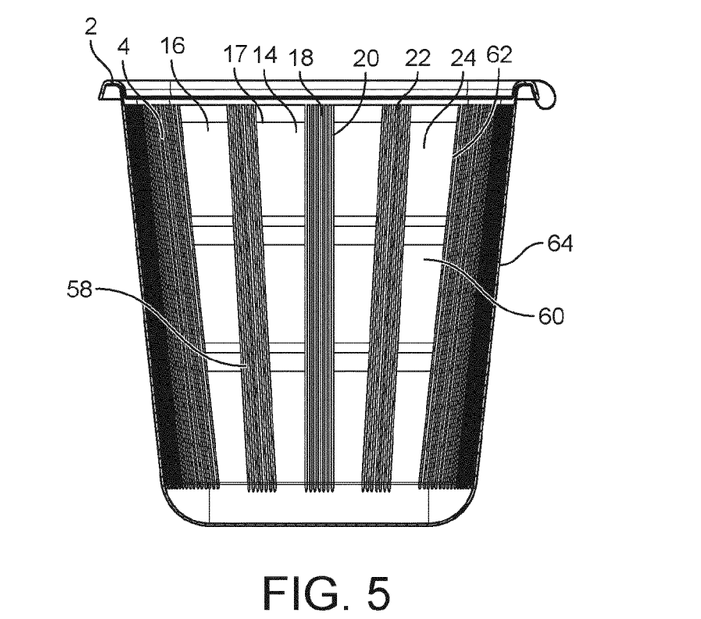
FIG. 5 is a vertical cross-sectional view through the pot of FIG. 4.
Figure 6:
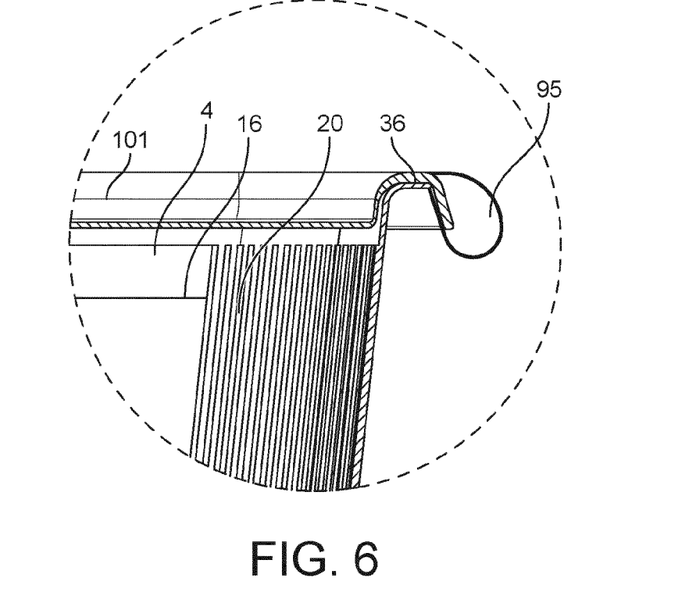
FIG. 6 is an enlargement of part of the vertical cross-sectional view of FIG. 5.

As shown in FIGS. 4 to 6, the assembled container, i.e. square pot, 2 comprises an annular sidewall 4 which comprises upper and lower annular peripheral edges 6, 8, and the base 10 which comprises the annular peripheral edge 12 which is integral with the lower annular peripheral edge 8 of the sidewall 4. The annular peripheral edge 12 of the base 10 surrounds the base wall structure 11 which is integral therewith. The base wall structure 11 comprises at least one injection moulding sprue 13 at a central region 15 of the base wall structure 11.

In one embodiment, the sidewall 4 and the base 10 are comprised in a single integral moulded body 3 composed of a thermoplastic polymer and define a central concavity 14 for packaging a product, such as a foodstuff (not shown). The single integral moulded body 3 is formed by injection moulding the intermediate article 100 having a flat or substantially planar configuration, as described hereinabove, which has subsequently been assembled to form the container, and the thermoplastic polymer has been injected through the sprue 13 to fill an injection moulding cavity for moulding the intermediate article 100 as described hereinbelow.

In this embodiment, the wall elements 16 of the sidewall 4 are integrally connected to the base 18, for example by live hinges or interconnecting tags composed of the thermoplastic polymer. Such a single integral moulded body 3 is injection moulded from a single gate in an injection mould. In this embodiment, the lid 101 may correspondingly be integrally connected to one of the wall elements 16 of the sidewall 4, for example by a live hinge or an interconnecting tag composed of the thermoplastic polymer. Alternatively, the lid 101 may be connected to one of the wall elements 16 of the sidewall 4 only by the flexible sheet 50, and the lid 101 is separately and individually moulded, by providing a first gate in an injection mould for injecting the thermoplastic polymer for moulding the sidewall 4 and the base 10 and a second gate in the injection mould for injecting the thermoplastic polymer for moulding the lid 101, and in this embodiment different thermoplastic polymer compositions could be used for moulding on the one hand the sidewall 4 and base 10 and on the other hand the lid 101.

In an alternative embodiment, the wall elements 16 of the sidewall 4 are not integrally connected to the base 18, but are separately and individually moulded, by providing a multi-gate injection mould in which each respective gate in the injection mould is arranged for injecting the thermoplastic polymer for moulding each respective part, i.e. each wall element 16 and the base 10. Accordingly, the wall elements 16 of the sidewall 4 are connected to the base 10 only by the flexible sheet 50, In this embodiment, the lid 101 may be separately moulded as described above, or integrally connected to one of the wall elements 16 of the sidewall 4, for example by a live hinge or an interconnecting tag composed of the thermoplastic polymer.

In the preferred embodiments of the present invention, the thermoplastic polymer may comprise a polyolefin or blend of a plurality of polyolefins, optionally polyethylene or polypropylene; or a polyester, optionally polyethylene terephthalate or polybutylene terephthalate; or polylactic acid. In a particularly preferred embodiment, the polymer comprises polypropylene. Polypropylenes having a Melt Flow Index (MFI) of from 10 to 120 are most particularly preferred. The Melt Flow Index of a polymer can be measured according to ASTM D1238.

In this specification, the term "annular" means "generally ring-like", is not limited to geometrically circular shapes, and encompasses shapes that may be circular or other than circular, for example elliptical, polygonal, etc. In the illustrated embodiment, the pot 2 is polygonal in plan, being substantially rectangular in plan, but with rounded corners. However, the pot 2 may have any desired plan shape, which may be any other polygonal shape, for example rectangular, triangular, pentangular, hexagonal, etc.

In this embodiment, the sidewall 4 has a polygonal shape in plan and comprises the plurality of wall elements 16 which are connected in series to form an endless wall member 17 extending upwardly from, and surrounding, the base 10. Each wall element 16 is disposed between respective portions of the upper and lower annular peripheral edges 6, 8. Each wall element 16 is outwardly inclined and planar. However, in other embodiments the wall elements 16 may be vertical, and orthogonal to the base 10, or inwardly or outwardly curved. Essentially, any desired three-dimensional design for the pot 2 may be employed.

The sidewall 4 comprises a lattice structure 18 of elongate ribs 20 interconnecting the upper and lower annular peripheral edges 6, 8. In the illustrated embodiment, the elongate ribs 20 extend between the upper and lower annular peripheral edges 6, 8 of the sidewall 4. The lattice structure 18 is an open framework 22 defining a plurality of sidewall openings 24. The wall elements 16 are connected at respective corner portions 19 of the sidewall 4. Accordingly, the elongate ribs 20 extend between the upper and lower annular peripheral edges 6, 8 of the sidewall 4 and are located between the upwardly oriented corner portions 19 of the sidewall 4. Each corner portion 19 has opposite upwardly oriented edges 21. The elongate ribs 20 in the sidewall 4 extend upwardly along the sidewall 4 and in each wall element 16 a plurality of the elongate ribs 20 are serially located in a mutually spaced configuration along a width of the wall element 20. The lattice structure 18 in the sidewall 4 is additionally provided with one or more elongate ribs 20 which extend in a circumferential direction around at least a fraction of the annular periphery of the sidewall 4. At least some of the elongate ribs 20 intersect with one or more other of the elongate ribs 20 at rib junctions to form an intersecting rib network.

The at least one injection moulding sprue 13 is connected to the upper annular peripheral edge 8 of the annular sidewall 4 by the base wall structure 11, the annular peripheral edge 12 of the base 10, the lower annular peripheral edge 8 of the sidewall 4 and the lattice structure 18 of the sidewall 4.

In this embodiment, the base wall structure 11 also comprises a base lattice structure 26 of elongate ribs 28 connected to the annular peripheral edge 12 of the base 10. The base lattice structure 26 is an open framework 30 defining a plurality of base openings 32. In the illustrated embodiment, the elongate ribs 28 intersect with one or more other of the elongate ribs 28 at rib junctions to form an intersecting rib network. At least some of the elongate ribs 28 extend radially outwardly from the centre 15 of the base 10, which comprises a central rib junction.

In an alternative embodiment, the sidewall and/or base 4 may comprise a solid layer of the thermoplastic polymer and are not provided with a lattice structure.

In the illustrated embodiment, the lattice structure 18 in the sidewall 4 and the lattice structure 26 in the base 10 are polygonal and the openings 24, 32 between the elongate ribs 20, 28 are polygonal. As illustrated, the lattice structures 18 28 are rectangular and the openings 24, 32 between the elongate ribs 20, 28 are rectangular or triangular. However, other shapes of openings may be provided in the sidewall 4 or base 10.

In the illustrated embodiment, the sidewall 4 and the base 10 comprise or consist of a solid, unfoamed layer of the thermoplastic polymer that is not provided with a lattice structure, or elongate ribs, or openings.

In an alternative embodiment, in at least one of lattice structures 18, 26 in the sidewall 4 or the base 10 at least some, preferably all, of the respective elongate ribs 20, 28 comprise elongate foam ribs. Each foam rib comprises opposed outer and inner unfoamed solid skins of the thermoplastic polymer on opposite sides of a central cellular foam core of the thermoplastic polymer. The foam structure may be provided by using the mould-opening method and apparatus disclosed in WO-A-2017/134181, WO-A-2019/025274 and WO-A-2020/048912.

The container 2 further comprises an upper annular peripheral rim 36 which is integral with the upper annular peripheral edge 6 of the sidewall 4. The rim 36 extends laterally outwardly circumferentially around the container 2. The rim 36 comprises or consists of a solid, unfoamed layer of the thermoplastic polymer. Optionally, when packaging a foodstuff a sealing film (not shown) is sealed to the upper surface of the rim 36.

The container further comprises the flexible sheet 50 which is bonded to the lattice structure 18 in the sidewall 4, and the lattice structure 26 in the base 10, to cover the sidewall openings 24, and the base openings 32, and form a sealed sidewall surface 52, and a sealed base surface 54, of the pot 2.

In the preferred embodiments, at least one or both of the outer surface 56 and the inner surface 60 of the flexible sheet 50 is printed and/or embossed. Such printing and embossing enable the flexible sheet 50 cosmetically to function as a label in the pot 2, as well as structurally functioning to provide the sealed sidewall surface 52, and the sealed base surface 54, of the pot 2.

In the illustrated embodiment, the flexible sheet 50 is bonded to an outer surface 64 of the lattice structure(s) 18, 26. The inner surface 58 of the lattice structure(s) 18, 26 and exposed regions of the inner surface 60 of the flexible sheet 50 within the sidewall and base openings 24, 32 form the interior surface 62 of the sidewall 4 and the base 10.

In alternative embodiments of the present invention, an outer surface 56 of the flexible sheet 50 is bonded to an inner surface 58 of the lattice structure(s) 18, 26 and an inner surface 60 of the flexible sheet 50 forms the interior surface 62 of the sidewall 4 and the base 10.

In the illustrated embodiment, the base 10 has base openings 32. In other embodiments, the base 10 may comprise a solid layer of the thermoplastic polymer and is not provided with a lattice structure 26, in which case the flexible sheet 50 either may be bonded to an inner or outer surface of the base 10.

In the illustrated embodiment, the flexible sheet 50 is a single cross-shaped sheet element 51 which has been 2-dimensionally pre-cut to have a shape and dimensions to fit the flexible sheet 50 to the base 10, wall elements 16 and lid 101 of the intermediate article 100.

Thereafter, the intermediate article 100 is assembled into a container, and the flexible sheet 50 is configured into a 3-dimensional shape which, in the final pot 2, covers the base 10 and extends upwardly to cover the sidewall openings 24. Each sidewall opening 24, and each base opening 32 is covered by a respective portion 25, 33 of the flexible sheet 50. The central part 66 covers the base 10 and the extending parts 68 cover a respective wall element 16 of the sidewall 4.

The outer peripheral edge 74 of the flexible sheet 50 may be bonded to the inner or outer surface of the sidewall 4. However, preferably the outer peripheral edge 74 of the flexible sheet 50 is sealed within the thickness of the sidewall 4 which provides an enhanced sealing bond between the flexible sheet 50 and the moulded body 3. Such a sealing structure means that if the flexible sheet comprises a foam layer, or a recycled polymer layer, the foam or recycled polymer layer is prevented from coming into direct contact with the contents, e.g. foodstuffs, which may be packaged within the container 2.

The peripheral end edges 70 of the flexible sheet 50 are bonded to the upper annular peripheral edge 6 of the sidewall 4. The extending parts 68 are bonded to the lattice structure 18 of the elongate ribs 20.

At each corner portion 19 of the sidewall 4, each of the opposite upwardly oriented edges 21 of the corner portion 19 has bonded thereto respective peripheral side edges 72 of the respective opposite extending part 68. At the corner portions 19 the peripheral side edges 72 may abut or overlap. However, it is preferred that at the corner portions 19 the peripheral side edges 72 of the opposite extending parts 68 are spaced from each other by a spacing 75 extending along the corner portion 19.

In the illustrated embodiment, each portion 25, 33 is under tension. This tension may have been formed, as described hereinafter, by providing that the flexible sheet 50 is composed of a heat-shrinkable material and during the bonding of the flexible sheet 50 to the moulded body 3, which comprises the sidewall 4 and base 10, the flexible sheet 50 is heat-shrunk. This heat shrinking step can provide that the flexible sheet 50 is shrunk in dimensions, in at least one shrinkage direction, more than the moulded body 3 during a moulding process in which the flexible sheet 50 is bonded to the moulded body 3 in an in-mould labelling (IML) process.

In alternative embodiments, each portion 25, 33 may be slack and thereby not under tension.

The flexible sheet 50 may be composed of a thermoplastic polymer film comprising a single polymer layer. The single polymer layer may comprise an oriented polymer film or a heat-shrunk polymer film. Alternatively, the flexible sheet 50 may be composed of a multilayer laminate. For example, the multilayer laminate may comprise a barrier layer comprising a metal or polymer. The flexible sheet 50 may alternatively be composed of any suitable sheet material for use in packaging, for example cardboard, metal or metallised plastics material. In other embodiments, the flexible sheet 50 may be composed of a woven or non-woven thermoplastic polymer fabric, preferably which is porous to air. In further embodiments, the flexible sheet 50 may be composed of a foamed thermoplastic polymer layer comprising opposed unfoamed solid skins of the thermoplastic polymer on opposite sides of a central cellular foam core of the thermoplastic polymer. Any of these alternative compositions for the flexible sheet 50 may be used with any structure of the sidewall and base and any shape and configuration of the moulded body 3 and the flexible sheet 50. The selection of any desired composition for the flexible sheet 50 primarily depends upon the end use of the container and the product to be packaged therein.

In a particularly preferred embodiment, in the intermediate article 100 and the assembled container 2 the injection moulded body 3 and the flexible sheet 50 are composed on the same thermoplastic polymer so that the entire container 2, which comprises the flexible sheet 50 bonded to the injection moulded body 3, can be recycled without having to separate the flexible sheet 50 from the injection moulded body 3. For example, the flexible sheet 50 and the injection moulded body 3 can both be composed of a polyolefin, such as polypropylene. Preferably, the polypropylene for the flexible sheet 50 comprises an oriented, preferably biaxially oriented or alternatively uniaxially oriented, polypropylene film, typically having a thickness of from 50 to 200 microns, for example from 75 to 150 microns.

The square pot 2 further comprises the removable lid 101. The lid 101 is also composed of the thermoplastic polymer used to form the moulded body to form the sidewall 4 and base 10 as described above. The lid 101 is removably fittable to the sidewall 4 and is connected to the sidewall 4 by the flexible sheet 50.

The lid 101 may be a solid layer of the thermoplastic polymer. However, alternatively, as illustrated, the lid 101 comprises a lid lattice structure 218 of elongate ribs 220 integrally connected to an annular peripheral edge 222 of the lid 101. As for the lattice structures of the previous embodiments, the lid lattice structure 218 is an open framework 224 defining a plurality of lid openings 226. The flexible sheet 50 is bonded to the lid lattice structure 218 to cover the lid openings 226 and form a sealed lid surface 228 of the container, in the form of the square pot 2.

The present invention also provides a method of forming a container, such as any of the containers of the previous embodiments. The flexible sheet can be incorporated into the container as an in-mould label (IML) using IML technology.

Figure 7:
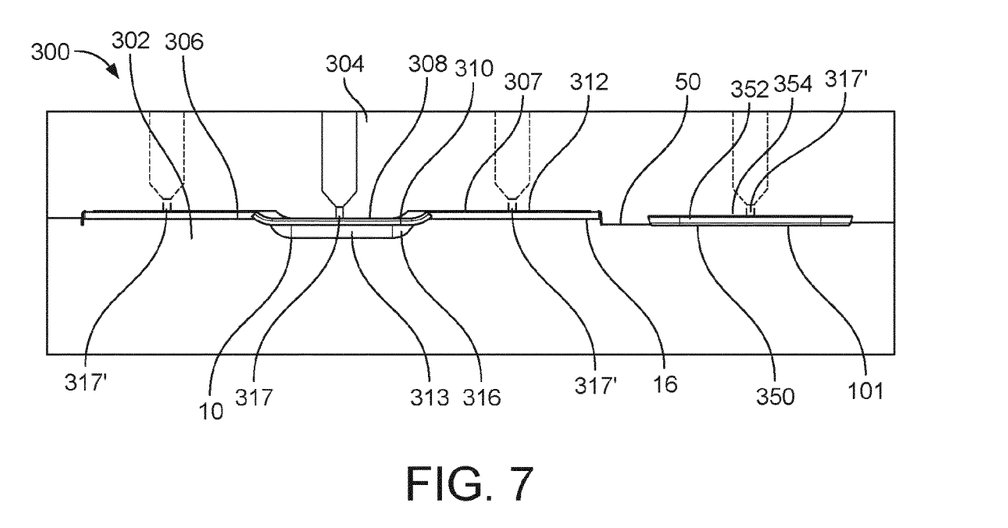
FIG. 7 illustrates in cross-section the structure of a mould for manufacture of an intermediate article for forming a container in accordance with a further embodiment of the present invention.
Figure 8:
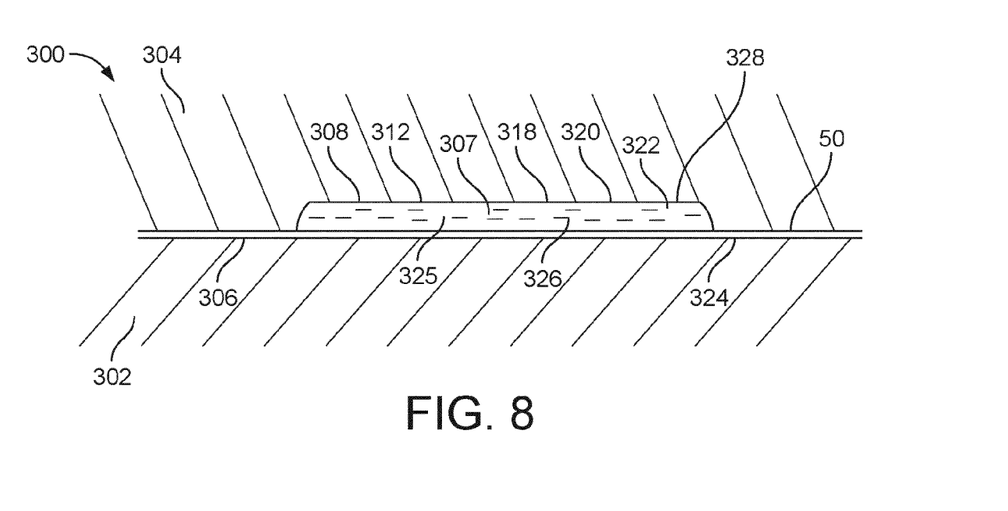
FIG. 8 is an enlarged view illustrating in cross-section the structure of a lattice-forming part and an in-mould label in the form of a flexible sheet in an injection mould cavity between opposed mould parts during manufacture of an intermediate article in accordance with a further embodiment of the present invention.

Referring to FIGS. 7 and 8, the method provides a mould 300 having a first mould part 302 and a second mould part 304. The first and second mould parts 302, 304 have respective first and second cavity-forming surfaces 306, 308 for forming the intermediate article 100 for assembly into the container 2.

In the illustrated embodiment, the first and second mould parts 302, 304 are, respectively, outer and inner mould parts for moulding the outer and inner surfaces, respectively, of the intermediate article 100 to form the container 2.

The in-mould flexible sheet 50, as described above, is provided between the first and second cavity-forming surfaces 306, 308.

The mould 300 is then closed, thereby defining a cavity 307 between the first and second cavity-forming surfaces 306, 308. The cavity 307 comprises a first cavity portion 310 being configured for moulding the polygonal base 10 and a plurality of second cavity portions 312 around the first cavity portion 310. Each of the second cavity portions 312 is configured for moulding a respective wall element 16 adjacent to a respective edge portion 6 of the polygonal base 10. The central part 66 of the flexible sheet 50 is located within the first cavity portion 310 and each extending part 68 of the flexible sheet 50 is located within a respective second cavity portion 312. The first cavity-forming surface 306 comprises a lattice-forming portion 318, comprising a latticed network 320 of concavities 322 in the second cavity-forming surface 308. In the illustrated embodiment, the lattice-forming portion 318 is in the inner mould part 304. The flexible sheet 50 is located within the cavity 307 adjacent to the lattice-forming portion 318 of the second cavity-forming surface 308.

A plurality of opening-forming portions 324 of the mould 300 are provided adjacent to the concavities 322. In the opening-forming portions 324 of the mould 300, the flexible sheet 50 is held between the first and second cavity-forming surfaces 306, 308.

The lattice forming portion 318 is preferably in the sidewall-forming portion 314 of the mould 300 to form a sidewall lattice structure, and may also be in the base-forming portion 316 of the mould 300 when a base lattice structure is to be formed.

Thereafter, a molten plastic composition 325 comprising the thermoplastic polymer is injected into the mould 300. This fills the cavity 307 with the molten plastic composition. The sidewall-forming portion 314 of the mould 300 forms a sidewall of the container and the base-forming portion 316 of the mould 300 forms a base of the container, the sidewall and base having structures as described above.

Accordingly, in at least the latticed network 320 of concavities 322 is injected a lattice-forming part 326 of the thermoplastic polymer. The lattice-forming part 326 defines a lattice structure 328, such as the sidewall and optional base lattice structures of the previous embodiments. Each lattice structure is an open framework defining a plurality of sidewall openings formed by the plurality of opening-forming portions 324 of the mould 300.

As described above, the base wall structure 311 comprises at least one injection moulding sprue 313 at a central region 315 of the base wall structure 311. The molten plastic composition is injected through a gate 317 into the cavity 307. The gate 317 is preferably on the opposite side of the mould cavity 307 from the side which receives the flexible sheet 50, as shown in FIG. 7; however, in an alternative embodiment the molten plastic composition could be injected through a hole in the flexible sheet 50 from a gate which is on the same side of the mould cavity 307 which receives the flexible sheet 50. The at least one injection moulding sprue 313 is connected to the upper annular peripheral edge of the annular sidewall by the base wall structure, the annular peripheral edge of the base, the lower annular peripheral edge of the sidewall and the lattice structure of the sidewall, as described hereinbefore.

Thereafter, the molten plastic composition is cooled to solidify the thermoplastic polymer and bond the flexible sheet 50 to the lattice structure 328 to cover the sidewall openings and form a sealed sidewall surface of the container. The container may then be removed from the mould 300.

Accordingly, the in-mould flexible sheet 50 may be located adjacent to an outer mould part of the first and second mould parts 302, 304 which forms an outer surface of the container, and in the moulded container the flexible sheet 50 is bonded to an outer surface of the lattice structure 328, and the inner surface of the lattice structure 328 and exposed regions of the inner surface of the flexible sheet 50 within the sidewall openings form an interior surface of the sidewall of the container 2.

Alternatively, the in-mould flexible sheet 300 may be located adjacent to an inner mould part of the first and second mould parts 302, 304 which forms an inner surface of the container, and in the moulded container the flexible sheet 50 is bonded to an inner surface of the lattice structure 328 and an inner surface of the flexible sheet 50 forms the interior surface of the sidewall of the container 2.

The in-mould flexible sheet 50 is additionally located in the base-forming portion 316 of the cavity 307, and in the molded container the flexible sheet 50 is additionally bonded to a surface of the base 10.

The base of the container may comprise a lattice structure. Accordingly, a base region of the second cavity-forming surface 308 may comprise a base lattice-forming portion, comprising a base latticed network of base concavities in the second cavity-forming surface 308. The flexible sheet 50 is located within the cavity 307 adjacent to the base lattice-forming portion of the second cavity-forming surface 308. This provides a plurality of base opening-forming portions of the mould 300 adjacent to the base concavities. In the base opening-forming portions of the mould 300, the flexible sheet 50 is held between the first and second cavity-forming surfaces 306, 308. A base lattice-forming part of the molten plastic composition is injected into the base latticed network of base concavities. Accordingly, the base lattice-forming part defines a base lattice structure as described above. The flexible sheet is bonded to the base lattice structure to cover the base openings and form a sealed base surface of the container.

As described above, the flexible sheet 50 may be heat-shrunk during moulding in a heat shrinking step whereby each portion of the heat-shrunk flexible sheet 50 is under tension in the moulded container. The heat shrinking step may be an intrinsic part of the moulding process, so that the heat shrinking occurs when the flexible sheet 50 is exposed to elevated temperatures during moulding. Alternatively, an additional heat shrinking step may be added after the moulded container has been removed from the mould or the mould has been at least partly opened.

FIG. 7 shows a single injection moulding sprue 313 and a single gate 317. This provides that the sidewall and base are integrally moulded to form a single body 3, as described above. In an alternative embodiment, the wall elements 16 and base 10 may be separately and individually moulded, and each part is moulded by injecting the molten plastic composition through a respective gate 317', as shown in phantom in FIG. 7. Correspondingly, the lid 101 may be integrally moulded by injecting the molten plastic composition through gate 317, as shown in FIG. 7, or separately moulded by injecting the molten plastic composition through a respective gate 317', as shown in phantom in FIG. 7.

As described above, the container may additionally comprise a lid, and the lid may be affixed to the remainder of the container, comprise the sidewall and base, by an extending part of the flexible sheet.

In order to make such a lid, in a further modification of the method of the present invention, the mould further comprises third and fourth cavity-forming surfaces 350, 352 defining a lid-forming cavity 354 for forming a lid of the container. The in-mould flexible sheet 50 extends into the lid-forming cavity 354. The molten plastic composition is injected into the lid-forming cavity 354 by a dedicated gate (not shown) to form the lid 101 composed of the thermoplastic polymer. The lid 101 is hingedly connected to the wall element 15 of the sidewall 4 by the flexible sheet 50.

As described above, the integral extension part 94 forms a hinge 95 for the lid 101 and/or a tamper evident connection between the lid 101 and the sidewall 4. A tamper evident connection can be achieved by perforating the flexible sheet 50 during an earlier step of cutting the peripheral edge of the flexible sheet 50 to provide a tear line which is precisely positioned at the hinge 95 when the flexible sheet 50 is over-moulded. Alternatively, the flexible sheet 50 may extend beyond the lid 101 and include a tear line which is opposite to the hinge 95 when the lid 101 is closed, for example after an extending flap of the flexible sheet 50 has been bonded to the sidewall opposite to the hinge 95.

As described above, the base 10, sidewall 4 and lid 101 of the container 4 are composed of thermoplastic polymer which is preferably injection moulded. The base 10, sidewall 4 and lid 101 may comprise respective lattice structures which are covered by the flexible sheet 50 which is bonded thereto. The flexible sheet 50 not only seals the lattice structures, and can function as a printed and/or embossed label, and can connect the lid 101 to the remainder of the container 2 and function as a hinge 95 and/or tamper evident device, but also the flexible sheet 50 can enhance the structural strength and integrity of the container 2.

Typically, the intermediate article 100 comprises a solid, unfoamed, layer of the injection moulded thermoplastic polymer which has a thickness of from 0.25 to 0.75 mm, optionally from 0.25 to 0.5 mm. Such solid, unfoamed regions of the thermoplastic polymer typically appear transparent to the naked eye.

In some embodiments of the present invention, the mechanical properties and dimensions of the in-mould flexible sheet 50 can be selected to control the shape, dimensions and properties of the resultant container 2.

The present invention provides a container preferably having a lattice structure in the sidewall, and optionally in the base and/or lid. The lattice structure defines openings which are sealed by the flexible sheet which is bonded to the sidewall, and optionally the base and/or lid. Typically, the surface area of a surface of the lattice structure is less than 75% of the surface area of the associated wall, base or lid in which the lattice structure is provided. The provision of openings between ribs reduces the weight of, and thermoplastic material in, the container. However, the combination of the ribs and the flexible sheet bonded thereto provides a high strength structure for the container sidewalls, and optionally also for the base and/or lid. The container can be manufactured using an injection moulding apparatus having an in-mould labelling (IML) capability.

The configuration of the base and sidewall, in particular with respect to the injection moulding sprue in the base, enables containers of a wide variety of shapes and dimensions to be manufactured reliably using an injection moulding method and apparatus. The provision of the lattice structure(s) comprising elongate ribs enables rapid, controlled and reliable molten material flow from the sprue throughout the injection moulding cavity. Weak points of convergence can readily be avoided by the provision of the elongate ribs, and by selecting the rib dimensions and rib spacing, which enhance uniform material flow from the base, up the sidewall and to the rim. The reduced surface area of the lattice structure as compared to a continuous solid wall enable the clamp pressure of the injection moulding apparatus to be reduced.

In the method of the invention, the flexible sheet is bonded to the injection moulded container body, and optionally the lid, using an in-mould labelling (IML) technique, so that the bond between the flexible sheet and the injection moulded container is achieved by fusing the solidified thermoplastic polymer to the surface of the flexible sheet. However, the container of the invention can alternatively be manufactured by another method, in which the injection moulded container body, and optionally the lid, are formed independently of the flexible sheet, i.e. without using an in-mould labelling (IML) technique, to produce a bare skeleton of the injection moulded container body, and optionally separately the lid. Thereafter, the flexible sheet can be bonded to the injection moulded container, and optionally the lid, by bonding the separate flexible sheet to the surface of the injection moulded container body, and optionally the lid, to form any of the container structures of the various embodiments described hereinbefore. In this modification of the manufacturing method, the flexible sheet can be bonded to the injection moulded container body, and optionally the lid, by an adhesive layer. For example, the flexible sheet can be self-adhesive, with an inner surface of the flexible sheet being coated with a pressure-sensitive, hot melt or thermally activated adhesive. Typically, the adhesive would be provided in a pattern which corresponded to the lattice pattern and other surface patterns in the container body and lid to which the flexible sheet is to be adhered.

In the preferred embodiments of the present invention, the container may be designed or configured to package foodstuffs, but the container may be used for any purpose. For example, the container may be formed as a fresh produce container, e.g. a pot or punnet for berries or mushrooms, or a flower pot, and the container sidewall and/or base, and optionally the flexible sheet, may be provided with air passage or drainage holes. The container may have heat resistance and may be suitable for warming foodstuff in an oven or microwave oven. The container may be disposable or reusable, and in either case is recyclable since the container is preferably composed of a single polymer, for example polypropylene.

Various modifications to the illustrated embodiments will be apparent to those skilled in the art and are intended to be included within the scope of the present invention as defined by the appended claims.

The invention claimed is:

1. An intermediate article for assembly to form a container, the intermediate article comprising:
a base which is polygonal in plan and comprises an annular peripheral edge comprising a plurality of edge portions surrounding a base wall structure, and
a plurality of wall elements around the base, each wall element being adjacent to a respective edge portion of the polygonal base, wherein each wall element has a pair of opposite outwardly extending edges having a sidewall structure therebetween, each outwardly extending edge comprising at least one member of a respective fixing mechanism for affixing adjacent outwardly extending edges of adjacent wall elements, wherein the sidewall and the base are composed of an injection moulded thermoplastic polymer, and
a flexible sheet which comprises a central part which is bonded to the base wall structure and a plurality of extending parts, each extending part being connected to, and extending away from, the central part, each extending part being bonded to the sidewall structure of a respective wall element,
wherein each extending part is connected to the central part by a respective hinge part of the flexible sheet, whereby each wall element is hingedly connected to the base by the respective hinge part,
wherein the wall elements can be hinged upwardly relative to the base to form a container having a sidewall which is polygonal in plan and defines a central concavity for packaging a product, wherein the sidewall comprises the plurality of wall elements which are connected in series to form an endless wall member extending upwardly from the base, each outwardly extending edge being affixed to an adjacent outwardly extending edge of an adjacent wall element by a respective fixing mechanism at a respective corner portion of the sidewall,
wherein the intermediate article further comprises a lid which is composed of a thermoplastic polymer and is removably fittable to the sidewall of the assembled container, and
wherein the flexible sheet comprises an integral extension part which is connected to a sidewall-covering portion of the flexible sheet which is bonded to one of the wall elements to form the sidewall and extends away therefrom to form a lid portion of the flexible sheet which is bonded to the lid.

2. The intermediate article of claim 1 wherein the sidewall structure comprises a lattice structure of elongate ribs interconnecting upper and lower peripheral edges of the wall element, wherein the lattice structure is an open framework defining a plurality of sidewall openings, and wherein the flexible sheet is bonded to the lattice structure to cover the sidewall openings and form a sealed sidewall surface of the wall element.

3. The intermediate article of claim 2 wherein in each wall element a plurality of the elongate ribs are serially located in a mutually spaced configuration along a width of the wall element.

4. The intermediate article of claim 2 wherein in the lattice structure in the wall element at least some of the elongate ribs extend in a transverse direction across at least a fraction of the width of the wall element.

5. The intermediate article of claim 4 wherein in the lattice structure in the base at least some of the elongate ribs extend radially outwardly from a centre of the base.

6. The intermediate article of claim 2 wherein the base wall structure comprises a base lattice structure of elongate ribs connected to the annular peripheral edge of the base, wherein the base lattice structure is an open framework defining a plurality of base openings, and wherein the flexible sheet is bonded to the base lattice structure to cover the base openings and form a sealed base surface of the container.

7. The intermediate article of claim 2 wherein each opening in the sidewall lattice structure and the base lattice structure is covered by a respective portion of the flexible sheet.

8. The intermediate article of claim 2 wherein in the lattice structure in the wall elements at least some of the elongate ribs intersect with one or more other of the elongate ribs at rib junctions to form an intersecting rib network.

9. The intermediate article of claim 1 wherein each of the outwardly extending edges of the wall elements has bonded thereto a peripheral side edge of a respective extending part of the flexible sheet.

10. The intermediate article of claim 9 wherein at each respective corner portion of the sidewall the peripheral side edges of the opposite extending parts of the flexible sheet are spaced from each other by a spacing extending along the corner portion.

11. The intermediate article of claim 1 wherein the flexible sheet has an outer peripheral edge which is sealed within the thickness of the sidewall or base.

12. The intermediate article of claim 1 wherein the integral extension part forms a hinge for the lid and/or a tamper evident connection between the lid and the sidewall.

13. The intermediate article of claim 1 wherein the lid comprises a lid lattice structure of elongate ribs integrally connected to an annular peripheral edge of the lid, wherein the lid lattice structure is an open framework defining a plurality of lid openings, and wherein the flexible sheet is bonded to the lid lattice structure to cover the lid openings and form a sealed lid surface of the container.

14. The intermediate article of claim 1 wherein the wall elements, sidewall and the base are integrally or separately moulded, the lid is separately moulded from the wall elements and the base, and the integral extension part of the flexible sheet comprises the sole mechanical connection between the lid and the sidewall in the container.

15. The intermediate article of claim 1 wherein the fixing mechanism comprises a plurality of snap-fitting locking members on the outwardly extending edges of the wall elements.

16. The intermediate article of claim 1 wherein the base and wall elements are integral and the base wall structure comprises at least one injection moulding sprue at a central region of the base wall structure.

17. The intermediate article of claim 1 wherein the flexible sheet is bonded to an outer surface of each sidewall structure and the base structure and the outer surface of the flexible sheet forms an exterior surface of the container.

18. The intermediate article of claim 1 wherein the flexible sheet is selected from the group consisting of:
a thermoplastic polymer film comprising a single polymer layer;
a multilayer laminate;
a woven or non-woven thermoplastic polymer fabric; and
a foamed thermoplastic polymer layer comprising opposed unfoamed solid skins of the thermoplastic polymer on opposite sides of a central cellular foam core of the thermoplastic polymer.

19. The intermediate article of claim 1 wherein at least one or both of an outer surface and an inner surface of the flexible sheet is printed and/or embossed.

20. A container formed from the intermediate article of claim 1, wherein the container is formed by hinging upwardly each wall element relative to the base by the respective hinge part to form an endless wall member in which the wall elements are connected in series to extend upwardly from the base to form an annular sidewall of the container, and each outwardly extending edge is affixed to an adjacent outwardly extending edge of an adjacent wall element by a respective fixing mechanism at a respective corner portion of the sidewall.

21. The intermediate article of claim 1 wherein the intermediate article is substantially planar.

22. The intermediate article of claim 1 wherein the central part of the flexible sheet is bonded to the base wall structure by fusing the thermoplastic polymer to the flexible sheet, and each extending part of the flexible sheet is bonded to the sidewall structure of a respective wall element by fusing the thermoplastic polymer to the flexible sheet.

23. An intermediate article for assembly to form a container, the intermediate article comprising
a base which is polygonal in plan and comprises an annular peripheral edge comprising a plurality of edge portions surrounding a base wall structure,
a plurality of wall elements around the base, each wall element being adjacent to a respective edge portion of the polygonal base, wherein each wall element has a pair of opposite outwardly extending edges having a sidewall structure therebetween, each outwardly extending edge comprising at least one member of a respective fixing mechanism for affixing adjacent outwardly extending edges of adjacent wall elements, wherein the sidewall and the base are composed of an injection moulded thermoplastic polymer, and
a flexible sheet which comprises a central part, which is bonded to the base wall structure by fusing the thermoplastic polymer to the flexible sheet, and a plurality of extending parts, each extending part being connected to, and extending away from, the central part, each extending part being bonded to the sidewall structure of a respective wall element by fusing the thermoplastic polymer to the flexible sheet,
wherein the sidewall structure comprises a lattice structure of elongate ribs interconnecting upper and lower peripheral edges of the wall element,
wherein the lattice structure is an open framework defining a plurality of sidewall openings,
wherein the flexible sheet is bonded to the lattice structure to cover the sidewall openings and form a sealed sidewall surface of the wall element,
wherein each extending part is connected to the central part by a respective hinge part of the flexible sheet, whereby each wall element is hingedly connected to the base by the respective hinge part,
wherein the intermediate article is substantially planar and the wall elements can be hinged upwardly relative to the base to form a container having a sidewall which is polygonal in plan and defines a central concavity for packaging a product, wherein the sidewall comprises the plurality of wall elements which are connected in series to form an endless wall member extending upwardly from the base, each outwardly extending edge being affixed to an adjacent outwardly extending edge of an adjacent wall element by a respective fixing mechanism at a respective corner portion of the sidewall;
wherein the intermediate article further comprises a lid which is composed of a thermoplastic polymer and is removably fittable to the sidewall of the assembled container, and wherein the flexible sheet comprises an integral extension part which is connected to a sidewall-covering portion of the flexible sheet which is bonded to one of the wall elements to form the sidewall and extends away therefrom to form a lid portion of the flexible sheet which is bonded to the lid.

\* \* \* \* \*